US008428655B2

(12) United States Patent
Kim

(10) Patent No.: US 8,428,655 B2
(45) Date of Patent: Apr. 23, 2013

(54) MOBILE COMMUNICATION TERMINAL AND A METHOD FOR PLACING A CALL

(75) Inventor: Kang Hee Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1013 days.

(21) Appl. No.: 11/836,012

(22) Filed: Aug. 8, 2007

(65) Prior Publication Data

US 2008/0039054 A1    Feb. 14, 2008

(30) Foreign Application Priority Data

Aug. 9, 2006    (KR) .................. 10-2006-0075134

(51) Int. Cl.
*H04B 1/38*    (2006.01)
(52) U.S. Cl.
USPC ............... 455/564; 455/412.1; 455/412.2; 455/466
(58) Field of Classification Search ............ 455/564, 455/412.1, 412.2, 466
See application file for complete search history.

(56) References Cited

U.S. PATENT DOCUMENTS

| | | | | |
|---|---|---|---|---|
| 6,029,063 | A * | 2/2000 | Parvulescu et al. | 455/412.1 |
| 6,836,651 | B2 * | 12/2004 | Segal et al. | 455/405 |
| 7,613,287 | B1 * | 11/2009 | Stifelman et al. | 379/215.01 |
| 2003/0190020 | A1 * | 10/2003 | Kitchings | 379/88.01 |
| 2004/0203613 | A1 * | 10/2004 | Zhu et al. | 455/412.1 |
| 2005/0096911 | A1 * | 5/2005 | Schmid et al. | 704/270.1 |
| 2005/0118986 | A1 * | 6/2005 | Barton et al. | 455/412.1 |
| 2006/0003705 | A1 * | 1/2006 | Toraguchi et al. | 455/74.1 |
| 2007/0013608 | A1 * | 1/2007 | Goo et al. | 345/1.1 |
| 2007/0033617 | A1 * | 2/2007 | Bloebaum | 725/58 |

FOREIGN PATENT DOCUMENTS

| | | |
|---|---|---|
| CN | 1547842 | 11/2004 |
| CN | 1286558 | 7/2005 |
| CN | 1725788 | 1/2006 |
| CN | 1761339 | 4/2006 |
| KR | 1020050104792 | 11/2005 |
| WO | 2005/091603 | 9/2005 |

* cited by examiner

*Primary Examiner* — Kamran Afshar
*Assistant Examiner* — Shahriar Behnamian
(74) *Attorney, Agent, or Firm* — Lee, Hong, Degerman, Kang & Waimey

(57) ABSTRACT

A mobile communication terminal having a phonebook replays a stored message when an entry of the phonebook is selected using a speed dial number and the stored message is associated with the selected phonebook entry. The message may be the spoken name of the person associated with the selected phonebook entry thereby enabling the terminal user to have an audio confirmation of the party being called. The message may be recorded by the terminal microphone or may be captured from a connected call. Alternatively the message may be a text message that is synthesized to a voice message by a text-to-speech function.

7 Claims, 5 Drawing Sheets

Voice recording

Start recording if signal sound rings

New text write

Mom, this is younger daughter, Mongsil.
I love you.

Menu 가 A a sym 1

MOBILE COMMUNICATION TERMINAL AND A METHOD FOR PLACING A CALL

CROSS REFERENCE TO RELATED APPLICATION

Pursuant to 35 U.S.C.§119(a), this application claims the benefit of earlier filing date and right of priority to Korean Patent Application No. 10-2006-0075134, filed on Aug. 9, 2006, the contents of which are hereby incorporated by reference herein in their entirety.

FIELD OF THE INVENTION

The present invention relates to a mobile communication terminal, and more particularly, to a method for placing a call. Although the present invention is suitable for a wide scope of applications, it is particularly suitable for providing a recorded voice of a called party by using a speed dial feature.

DISCUSSION OF THE RELATED ART

Generally, a terminal includes a variety of functions to increase user convenience. The functions may include one or more of an MP3 player, a camera, Bluetooth™ data link, and infrared communication. The terminal may also include a speed dialing function whereby a user may select a stored phone number from a phonebook by entering one, two, or three digits.

The most advanced terminal technology is accompanied with complicated functions and difficulty in use, and speed dialing functions have been incorporated into terminals for some time to alleviate this problem. However, a user still has difficulty and inconvenience in confirming a called party.

SUMMARY OF THE INVENTION

Accordingly, the present invention is directed to a mobile communication terminal and a method for placing a call that substantially obviate one or more problems due to limitations and disadvantages of the related art.

An embodiment of the present invention provides a terminal and a method for placing a call, by which the terminal replays a stored message when a phonebook entry is selected using a speed dial number and the stored message is associated with the selected phonebook entry. Replaying the stored message provides an audio indication associated with the called number.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with a purpose of the invention, as embodied and broadly described herein, a method of making a call in a terminal according to one embodiment includes entering a speed dial number from a key input unit to select one of a plurality of phonebook entries wherein each phonebook entry includes a contact number, replaying an audio message if the audio message is associated with the selected phonebook entry, and dialing the contact number of the selected phonebook entry.

Entering the speed dial number comprises entering one, two, or three digits followed by a function key, or alternatively, pressing a number key on the key input unit for a specified duration of time. Completion of the specified duration of time may be indicated by an audible sound. If the audio message is associated with the selected phonebook entry, the audio message is replayed for a pre-selected duration of time. The audio message may be recorded using a microphone disposed on the terminal or may be recorded from a connected call, and stored in a memory of the terminal. Further, the audio message may be password protected.

In another embodiment of the invention, a method of placing a call using a mobile communications terminal, the method comprises entering a speed dial number from a key input unit to select one of a plurality of phonebook entries wherein each phonebook entry includes a contact number, converting a text message to a voice message if the text message is associated with the selected phonebook entry, and dialing the contact number of the selected phonebook entry.

The text message is converted to a voice message using a text-to-speech (TTS) function, wherein the TTS function includes at least one of a male voice, a female voice, and a child voice. The text message may be password protected and the voice message may be played for a pre-selected duration.

In yet another embodiment of the invention, a mobile communications terminal comprises a key input unit configured to provide a speed dial number, an audio output unit, a microphone configured to receive a voice input, a memory configured to store a plurality of phonebook entries and a plurality of messages wherein each phonebook entry comprises at least a contact number is associated with one of the plurality of phonebook entries, and a control unit configured to select one of the plurality of phonebook entries according to the speed dial number, to play the message if the message is associated with the selected phonebook entry, and to dial the contact number of the selected phonebook entry.

The terminal may further comprise a text-to-speech (TTS) configured to convert the message to a voice message if the voice message is a text message, wherein the TTS synthesizer includes at least one of a male voice, a female voice, and a child voice, and the control unit is further configured to play the voice message for a pre-selected duration.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The terminal described in this specification can include portable electronic devices such as a mobile phone, a digital broadcast terminal, an MP3 player, a personal digital assistant (PDA), and a portable multimedia player (PMP).

A speed dial function is characterized by accessing a terminal phonebook entry by entering one, two, or three digits, and when the particular phonebook entry is accessed, dialing the phone number associated with that particular phonebook entry. A phonebook entry may also be accessed by pressing a particular key for a specified duration rather than by entering a speed dial number and then pressing a separate function key to access the phonebook entry. In describing embodiments of this invention, either pressing a single key for a specified duration or entering one or more digits followed by a separate function key will enter a speed dial number.

Figure 1:
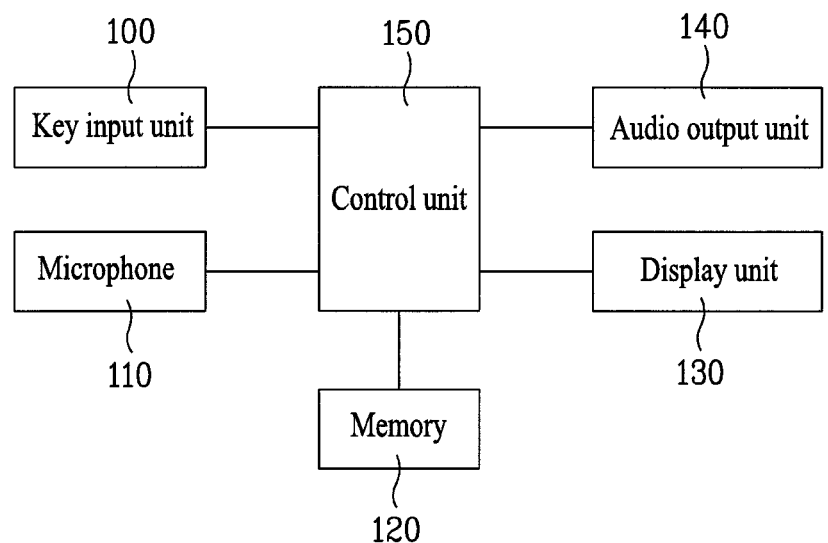
FIG. 1 is a block diagram of a terminal according to the present invention.

FIG. 1 is a block diagram of a terminal according to the present invention. Referring to FIG. 1, the terminal includes a key input unit 100 as a user interface. The key input unit 100 has a plurality of number and function keys for providing information to the control unit 150.

Other elements of the terminal include a microphone 110; a memory 120 for storing programs and data to control the overall operation of the terminal; a display unit 130 for displaying data corresponding to signals from the key input unit 100, received data, and operational status of the terminal according to the control unit 150; and an audio output unit 140.

The control unit 150 controls providing a stored audio message to the audio output unit 140 when a speed dial number is provided. The memory 120 stores audio messages, contact numbers, and corresponding speed dial numbers. A speed dial number is entered to initiate a call. The speed dial number selects a phonebook entry, and if a stored audio message is associated with the selected phonebook entry, the stored audio message is replayed. After completion of replaying the stored audio message, the control unit 150 transmits a dual tone multi frequency (DTMF) tone signal to initiate a call to the contact number stored in the phonebook entry.

Figure 2:
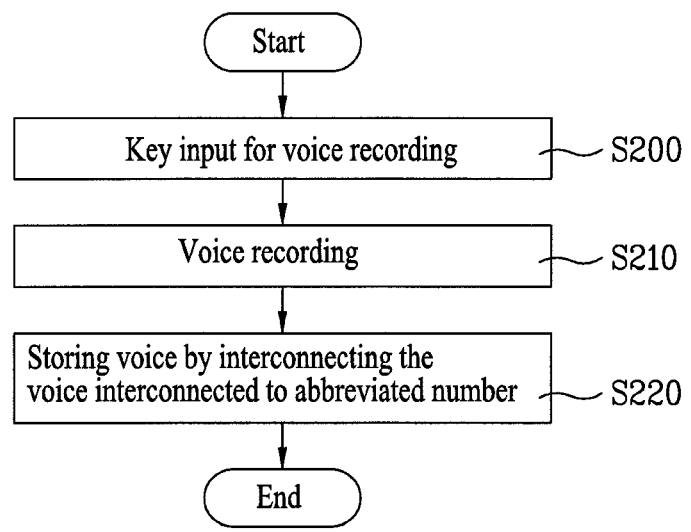
FIG. 2 is a flowchart of a process for recording a voice in a terminal according to the present invention.

FIG. 2 is a flowchart of a process for recording a voice in a terminal according to the present invention. A command for a recording an audio message (S200) is entered in a terminal menu, and a message is recorded (S210). Any audio message may be recorded.

The recorded audio message is then stored in memory and associated with a phonebook entry (S220).

Figure 3:
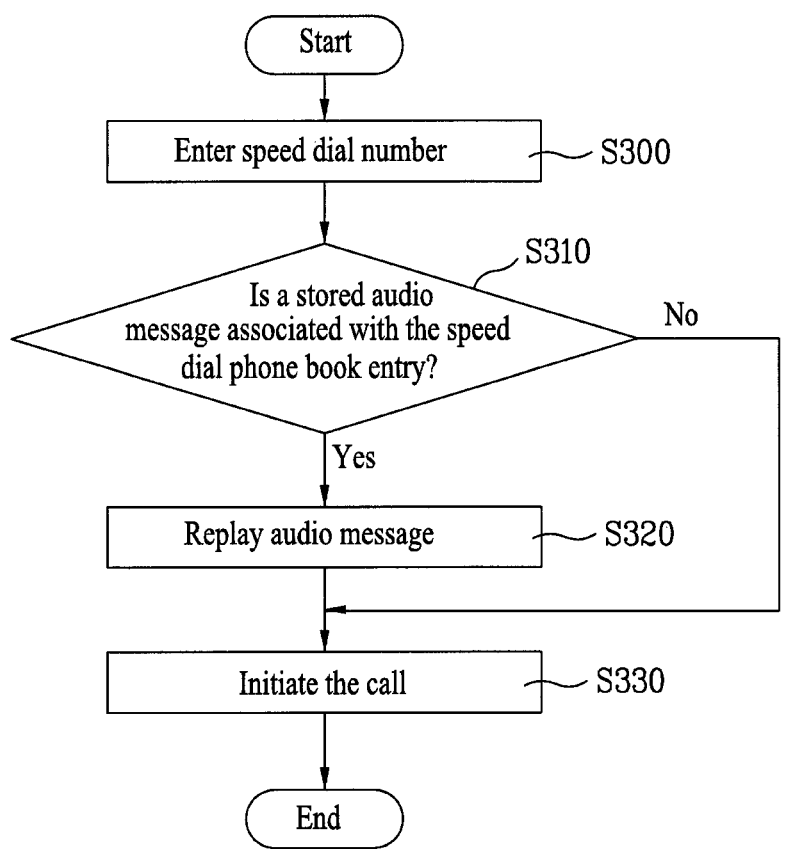
FIG. 3 is a flowchart of a process for outputting a voice using an abbreviated number in a terminal according to an embodiment of the present invention.

FIG. 3 is a flowchart showing use of the stored audio message. A speed dial number is entered into the terminal to select a phonebook entry to initiate a call. When the phone call is initiated, the control unit 150 determines whether the stored audio message is associated with the phonebook entry (S310). If a stored audio message is associated with the phonebook entry, then the stored audio message is provided to the audio output unit 140 (S320). The contact number is dialed at the completion of replaying the stored audio message, or if no stored audio message is associated with the phonebook entry, the contact number is dialed directly (S330).

The stored audio message may be a message recorded by the terminal user or it may be recorded from a correspondent party of an earlier communication.

FIGS. 4 to 8 depict displays which illustrate a method for replaying a stored message using a speed dial number according to one embodiment of the present invention.

Figure 4:
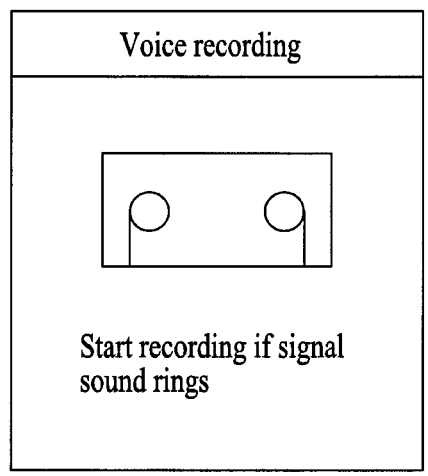
FIGS. 4 to 8 are diagrams of a display depicting embodiments of the present invention.

Referring to FIG. 4, a voice recording is made according to a menu item, and the duration of the recording is preset to a specific length, for example, 5, 10 or 20 seconds. The voice recording is associated with a phonebook entry and stored in memory as an audio message. Ring tones are currently offered as a downloadable file from a service and can also be stored as an audio message associated with a phonebook entry.

In one embodiment, the stored audio message is provided to the audio output unit when a phonebook entry is selected and a call initiated. For instance, if a user sets a play time to five seconds, a stored audio message is replayed for five seconds instead a dial tone. At the completion of the audio message, the call is initiated by dialing the contact number.

In particular, a phonebook entry will include at least a correspondent party's name, a speed dial number, a phone number of the correspondent party (contact number), and a stored audio message.

The speed dial number, the contact number, and the stored audio message are stored together. In general, a stored audio message requires about 30 KB for a 30 second message. In particular, assuming that a size of an MP3 file is about 5 MB, then about 5 MB is usable for storing about 100 audio messages by associating the audio messages with phonebook entries. Therefore it is possible to store more messages in a smaller amount of memory.

When a record command is provided during a connected call, the conversation of parties to the call is stored by associating the recorded conversation with a speed dial number. If the speed dial number is subsequently entered, the conversation recorded during the call is replayed when the phonebook entry associated with the speed dial number is selected. Namely, parties to conversations are able to be recorded. According to one embodiment of the present invention, the recorded conversation is stored by associating with a speed dial number. In case of making an outgoing call, the conversation can be replayed.

As an added measure of privacy protection, the stored audio message or conversation may be password protected.

Figure 5:
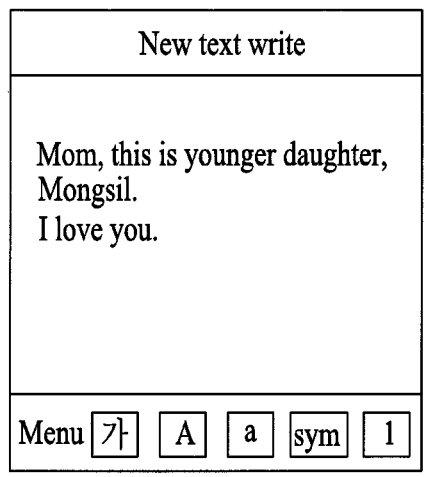

In another embodiment, a text message may be stored by associating a phonebook entry having a speed dial number to the text message. Referring to FIG. 5, a text message is associated and stored with a selected phonebook entry. A stored text message is shown in FIG. 6.

Figure 6:
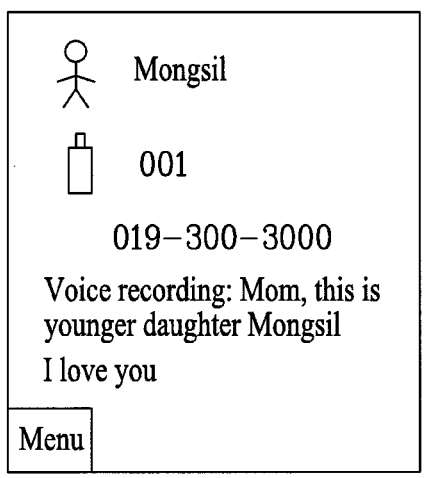
Figure 7:
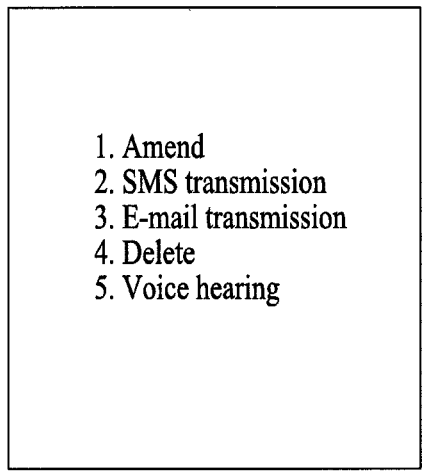

Selecting the "Menu" function shown in the lower left portion of the display shown in FIG. 6 will display a further menu of subsequent actions shown in FIG. 7. If "voice hearing" is selected, the stored audio message will be replayed. If the stored message is a text message, the text message will be vocalized using a text-to-speech (TTS) function thereby enabling a sight-impaired user to listen to the text message. The TTS function includes at least one of a female voice, a male voice, and a baby voice.

Figure 8:
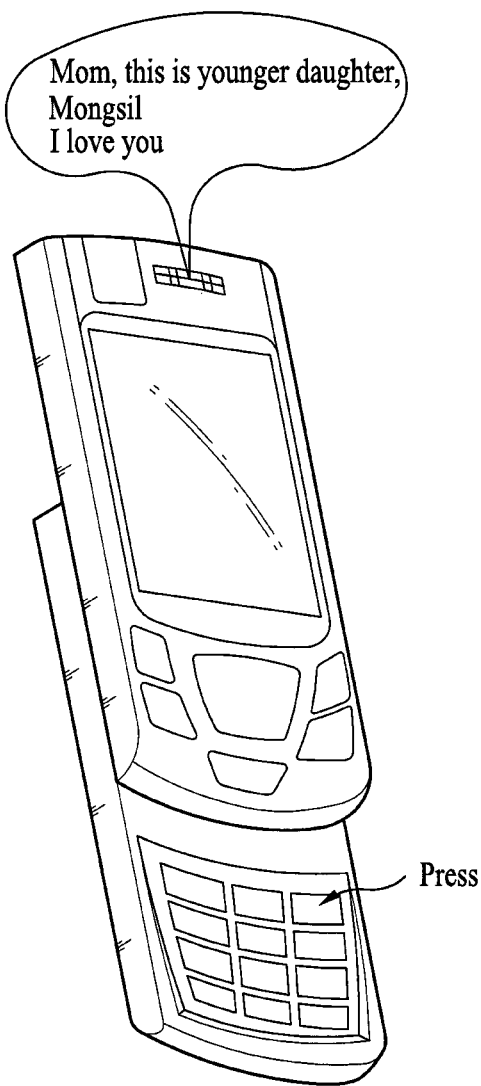

The present invention is further explained in detail. A name "Mongsil" and contact number "019-300-3000" are entered into the terminal phonebook, a recording of Mongsil's voice is associated with Mongsil's phonebook entry, and Mongsil's phonebook entry is assigned a speed dial number of "1". When "1" is pressed for a specified duration to initiate a phone call, Mongsil's recorded message is replayed before the outgoing call is initiated (FIG. 8). Therefore, the terminal user has an audio indication to whom the call has been placed.

Accordingly, the present invention provides the following advantage. When a terminal user places a call using a speed dial number, the user is able to hear the name of the called party in the party's own voice as soon as the phonebook entry is selected. Therefore, the terminal user is able to reconfirm to whom the outgoing call has been placed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of initiating communication via a mobile terminal, the method comprising:
   receiving a text message from another party;
   matching the received text message to a phonebook entry corresponding to the another party;
   storing the received text message in association with the matched phonebook entry;
   receiving a selection, via an input unit of the mobile terminal, of the matched phonebook entry corresponding to the another party to initiate a call to the another party, wherein the phonebook entry corresponding to the another party includes at least a name and a contact number;
   converting the stored text message associated with the selected phonebook entry to a voice message in response to the receiving of the selection;
   outputting the voice message via an audio output unit of the mobile terminal in response to the receiving of the selection; and
   initiating the call to the another party after completing the output of the voice message,
   wherein the text message is a short message service (SMS) message.

2. The method of claim 1, wherein the selection comprises a speed dial number.

3. The method of claim 1, wherein the communication is a voice call.

4. The method of claim 1, wherein converting the stored text message to a voice message comprises using a text-to-speech (TTS) function.

5. The method of claim 4, wherein the TTS function includes at least one of a male voice, a female voice, and a child voice.

6. The method of claim 4, further comprising playing the voice message for a pre-selected duration.

7. The method of claim 4, wherein the text message is password protected.

* * * * *